US009124808B2

(12) United States Patent
Byren (10) Patent No.: US 9,124,808 B2
(45) Date of Patent: Sep. 1, 2015

(54) FOVEATED IMAGING SYSTEM AND METHOD (71) Applicant: Raytheon Company, Waltham, MA (US)

(72) Inventor: Robert W. Byren, Manhattan Beach, CA (US)

(73) Assignee: Raytheon Company, Waltham, MA (US)

(*) Notice: Subject to any disclaimer, the term of this patent is extended or adjusted under 35 U.S.C. 154(b) by 91 days.

(21) Appl. No.: 13/860,893

(22) Filed: Apr. 11, 2013

(65) Prior Publication Data

US 2014/0247372 A1 Sep. 4, 2014

Related U.S. Application Data (60) Provisional application No. 61/772,380, filed on Mar. 4, 2013.

(51) Int. Cl.
*H04N 5/232* (2006.01)
*H04N 5/225* (2006.01)

(52) U.S. Cl.
CPC ......... *H04N 5/23296* (2013.01); *H04N 5/2254* (2013.01); *H04N 5/23232* (2013.01)

(58) Field of Classification Search
None
See application file for complete search history.

(56) References Cited

U.S. PATENT DOCUMENTS

| 6,252,989 B1 | 6/2001 | Geisler et al. |
| 6,421,185 B1 | 7/2002 | Wick et al. |
| 6,473,241 B1 | 10/2002 | Wick et al. |
| 7,973,834 B2 | 7/2011 | Yang |
| 2003/0020709 A1* | 1/2003 | Naegle et al. ................. 345/419 |
| 2007/0216794 A1* | 9/2007 | Neidrich ........................ 348/335 |
| 2010/0080473 A1 | 4/2010 | Han et al. |
| 2012/0213270 A1 | 8/2012 | Baraniuk et al. |
| 2012/0257101 A1* | 10/2012 | Bub ............................. 348/362 |
| 2012/0288003 A1 | 11/2012 | Do et al. |

FOREIGN PATENT DOCUMENTS

| WO | WO-2008/138543 A1 | 11/2008 |
| WO | WO-2014/158291 A2 | 10/2014 |

OTHER PUBLICATIONS

"International Application Serial No. PCT/US2014/010135, International Search Report mailed Nov. 4, 2014", 3pgs.

(Continued)

*Primary Examiner* — Albert Cutler
(74) *Attorney, Agent, or Firm* — Schwegman Lundberg & Woessner, P.A.

(57) ABSTRACT

A time-varying image is synthesized having at least one time-varying region of interest therewithin. The image is spatially modulated with an array of modulating pixels to form a modulated image. The array of modulating pixels has a modulator resolution. The modulated image is sensed with an array of sensor pixels. The array of sensor pixels has a sensor resolution. The modulator resolution is finer than the sensor resolution. Each sensor pixel corresponds to a plurality of modulating pixels. Said sensor pixel and said plurality of modulating pixels subtend the same region in the image. Outside the region of interest, the modulated image is synthesized at the sensor resolution and at a sensor video frame rate. Inside the region of interest, the modulated image is synthesized at the modulator resolution and at an effective synthesized video frame rate that is less than sensor video frame rate.

4 Claims, 6 Drawing Sheets (56) References Cited

OTHER PUBLICATIONS

"International Application Serial No. PCT/US2014/010135, Written Opinion mailed Nov. 4, 2014", 6 pgs.

Bub, Gil, et al., "Pixel multiplexing for high-speed multi-resolution fluorescence imaging", [online], [retrieved on Oct. 16, 2014]. Retrieved from the Internet: <URL:http://arxiv.org/abs/0910.0789>, (Oct. 5, 2009), 1-3.

* cited by examiner

FOVEATED IMAGING SYSTEM AND METHOD

CLAIM OF PRIORITY

This patent application claims the benefit of priority of U.S. Provisional Patent Application Ser. No. 61/772,380, entitled "Foveating Camera With Digital Micromirror Device (DMD) coding and method for providing wide area motion imagery (WAMI) At Full-Motion Video (FMV) Rates", filed on Mar. 4, 2013, which is hereby incorporated by reference in its entirety.

TECHNICAL FIELD

Embodiments pertain to foveated imaging methods and systems suitable for use on manned or unmanned intelligence, surveillance and reconnaissance (ISR) platforms.

BACKGROUND

There are many uses for collecting video imagery, such as for manned or unmanned intelligence, surveillance, and reconnaissance. For instance, a camera may be mounted in an aircraft, flown over a particular scene of interest, and used to collect video imagery of the scene from above. Information from the collected video imagery may be used to perform various tasks, such as identify the presence or identity of particular vehicles or people in the scene. Particular tasks may involve different levels of resolution from the video imagery. For instance, a relatively coarse resolution may allow a user to determine if a person is present in the scene, while a relatively fine resolution may allow the user to determine the identity of or the type of activity being performed by the person in the scene.

SUMMARY

Many current video imaging systems are limited by data bandwidth. Such video imaging systems cannot store, process, and/or transmit a relatively large stream of data produced by the simultaneous use of a large field of view, high resolution across the full field of view, and typical video frame rates. There exists a need for a video imaging system that allows for a large field of view, allows for coverage of the field of view with a relatively coarse resolution, allows for coverage as needed of one or more regions of interest within the field of view with a relatively high resolution, and produces a data stream that can fit within typical data bandwidths.

An example technique, known as foveated imaging, uses an increased resolution in a portion of the field of view. Advantageously, the present device and methods allow for foveated imaging using a sequence of optical elements that can remain fixed with respect to each other, without the need for optical elements that move or can be moved within the field of view. The portion having increased resolution can include one or more regions of interest. The regions of interest may be anywhere within the field of view, and may change size and shape dynamically.

In accordance with some examples, a camera capable of providing wide area motion imagery at full-motion video rates while simultaneously providing higher resolution imagery at slightly less than full-motion video rates in multiple regions of interest through the use of a digital micromirror device array in conjunction with single pixel camera computational imaging techniques is provided. In these examples, compressive sensing and/or single pixel camera techniques may be applied to region(s) of a focal plane array to create one or more foveated, locally high resolution image within a full-motion video wide area motion imagery field of view. In these examples, a digital micromirror device may be placed at an intermediate focal plane with a higher multiple (e.g., a 2P-by-2Q) resolution than the focal plane array (e.g., P-by-Q). At an initial full-motion video wide area motion imagery mode, all digital micromirror device elements may be switched on to reflect a full image onto the focal plane array. Once the region of interest is specified, a region of the digital micromirror device may be configured to start a coded reflection pattern to capture higher resolution imagery than the focal plane array to be reconstructed for more detail. While the region of interest is being collected and reconstructed at less than full-motion video rate, the rest of the scene may be collected at the full-motion video rate.

An example method synthesizes a time-varying image having at least one time-varying region of interest therewithin. The time-varying image is spatially modulated with an array of modulating pixels to form a modulated image. The array of modulating pixels has a modulator resolution. The modulated image is sensed with an array of sensor pixels. The array of sensor pixels has a sensor resolution. The modulator resolution is finer than the sensor resolution. Each sensor pixel corresponds to a plurality of modulating pixels. Said sensor pixel and said plurality of modulating pixels subtend the same region in the time-varying image. Outside the region of interest, the modulated image is synthesized at the sensor resolution and at a sensor video frame rate. Inside the region of interest, the modulated image is synthesized at the modulator resolution and at an effective synthesized video frame rate that is less than the sensor video frame rate.

In another example method, an unmodulated image is formed of a time-varying scene. The unmodulated image is modulated with a multi-pixel spatial modulator to form a modulated image of the time-varying scene. The multi-pixel spatial modulator includes a plurality of modulator pixels. Each modulator pixel is switchable between an on state and an off state. Each modulator pixel in an on state contributes to the modulated image at a location of the modulator pixel with an optical power proportional to an optical power of the unmodulated image incident on the respective modulator pixel. The modulated image is sensed with a multi-pixel sensor. The sensor includes a plurality of sensor pixels. The sensor pixels are fewer in number than the modulator pixels. The modulated image is synthesized at a first resolution and a first video frame rate. A region of interest is identified within the time-varying scene. The region of interest is synthesized with a second resolution finer than the first resolution, and a second video frame rate slower than the first video frame rate.

An example system images a scene. An imaging optic is configured to collect light from the scene, to form an unmodulated incident beam from the collected light, and to form an unmodulated image of the scene with the unmodulated incident beam. A spatial light modulator is configured to receive the unmodulated incident beam, to receive the unmodulated image thereon, and to form a modulated exiting beam. The spatial light modulator includes an array of light modulating elements switchable between a first state and a second state. The spatial light modulator directs portions of the unmodulated incident beam that strike light modulating elements in the first state into the modulated exiting beam. The spatial light modulator blocks portions of the unmodulated incident beam that strike light modulating elements in the second state from entering the modulated exiting beam. A reimaging optic is configured to collect the modulated exiting beam, and to form a spatially modulated image from the modulated exiting beam. The spatially modulated image resembles the scene in areas corresponding to light modulating elements in the first state. A sensor is configured to receive the spatially modulated image thereon. The sensor includes an array of sensor elements. The sensor elements are fewer in number than the light modulating elements. The sensor produces an electrical output signal representative of the spatially modulated image. A processing element, for example a computer, is configured to receive the electrical output signal and switch the light modulating elements between the first state and the second state. When at least one region of interest is identified in the scene, the processing element switches the light modulating elements to produce an increase in resolution in the at least one region of interest, and a decrease in video frame rate in the at least one region of interest.

This summary is intended to provide an overview of subject matter of the present patent application. It is not intended to provide an exclusive or exhaustive explanation of the invention. The Detailed Description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
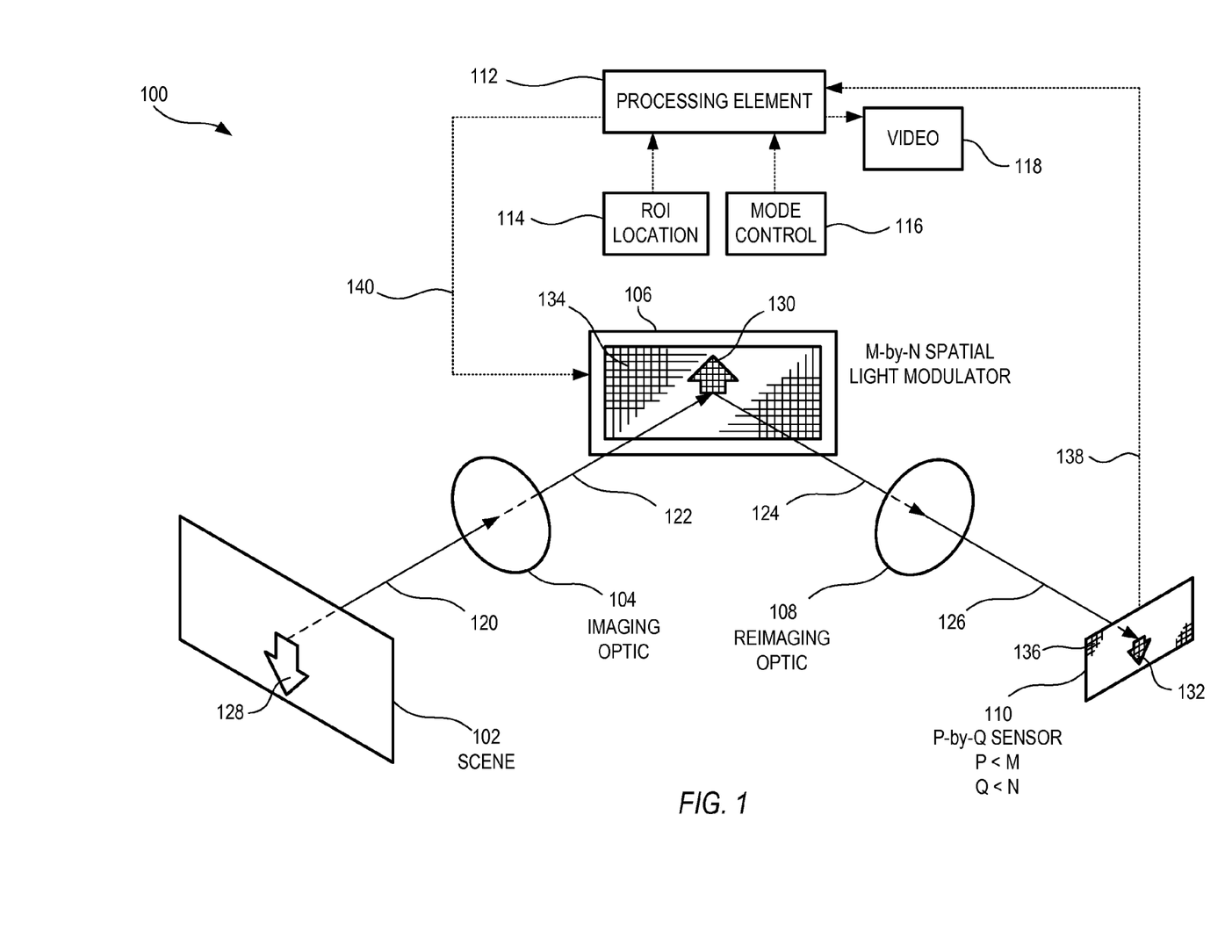
FIG. 1 is a schematic drawing of an example foveated imaging system.

FIG. 1 is a schematic drawing of an example foveated imaging system 100. The system 100 is configured to receive light reflected from and/or produced by a scene 102, where the scene 102 is not part of the system 100. In an example application, the system 100 may be included within an aircraft and flown above terrain, and the scene 102 may be a portion of the terrain within the field of view of the imaging system 100. In most applications, a user does not have direct access to the scene 102, and acquires strategic information from the scene 102 only by forming images of the scene 102 from a distance, and interpreting the images.

The scene 102 may include strategic information, some of which may be determined by imaging the scene 102 with a relatively low resolution, such as the emergence of a person from a vehicle or a building. There may be additional strategic information that may be determined by imaging portions of the scene with a relatively high resolution, such as the identity of a person or a license plate of a vehicle.

The system 100 can perform both low-resolution and high-resolution imaging of the same scene 102. Typically, the system 100 performs low-resolution imaging of the entire scene 102, which occupies a full field of view within the system 100. The low-resolution imaging is typically performed at a standard video frame rate, which is often referred to as full-motion video. Typical system bandwidths may accommodate the data stream produced by the simultaneous use of the full field of view, low resolution, and the standard video frame rate. When an object of interest is detected from a low-resolution image of the scene 102, such as by a user or by a software algorithm, the system 100 may generate a region of interest (ROI) at or near the object of interest. The system can perform high-resolution imaging of the region of interest, but at a reduced video frame rate. Typical system bandwidths may accommodate the data stream that includes the simultaneous use of a region of interest within the field of view, high resolution, and a reduced video frame rate for the region of interest. In some examples, high resolution imaging of the region of interest may be interleaved with low resolution imaging of the full field of view. In some examples, more than one object of interest may be identified within a particular scene 102, and the system 100 may use two or more regions of interest simultaneously. Regions of interest may also disappear from the field of view, caused by movement of the object of interest out of the field of view, by movement of the field of view away from the object of interest, or by conditions within the scene 102, such as a person entering a building and disappearing from view.

The scene 102 may reflect ambient light, such as sunlight or an illuminating beam. The scene may also produce light, such as in the visible portion of the spectrum from electric lighting, or in the infrared portion of the spectrum, such as from people or from relatively warm or hot objects. The system 100 collects a portion 120 of the light from the scene 102. The portion 120 of light passes through an imaging optic 104. A suitable imaging optic 104 can include a single-element or a multi-element lens, a single-element or a multi-element mirror, or a combination of at least one lens and at least one mirror. The imaging optic 104 may include anti-reflection coatings on one or more optic surfaces, as needed, which may be designed for suitable wavelength ranges and incident angle ranges.

The imaging optic 104 is configured to form an unmodulated incident beam 122 from the collected portion 120 of the light from the scene 102. At a focal plane of the imaging optic 104, the unmodulated incident beam 122 forms an unmodulated image of the scene 102. In some cases, the resolution in the unmodulated image of the scene 102 is limited by wavefront aberrations and/or chromatic aberration from the imaging optic 104. For an imaging optic 104 that is well-corrected, the wavefront aberrations and/or chromatic aberration may be sufficiently small so that the imaging optic 104 is limited by the effects of diffraction (i.e., diffraction-limited). A typical estimate for diffraction-limited resolution in the unmodulated image of the scene 102 is the wavelength of the light, multiplied by the F-number of the imaging optic 104.

A spatial modulator 106 is configured to receive the unmodulated incident beam 122. The spatial modulator 106 is spaced apart from the imaging optic 104 so that the unmodulated image is at or near the spatial modulator 106. Light exiting the spatial light modulator 106 forms a modulated exiting beam 124. In most examples, the modulated exiting beam 124 is reflected from the spatial light modulator 106, although in some examples the modulated exiting beam 124 may be transmitted through the spatial light modulator 106.

The spatial light modulator 106 includes an array of light modulating elements 134, which may be referred to as modulator pixels. The spatial light modulator 106 may include a rectangular array of modulator pixels, numbering M-by-N, where M and N are integers. The light modulating elements 134 are switchable between a first state and a second state. Modulating elements 134 in the first state may direct portions of the unmodulated incident beam 122 into the modulated exiting beam 124. Modulating elements 134 in the second state may block or divert portions of the unmodulated incident beam 122 from entering the modulated exiting beam 124. In this manner, the spatial modulator 106 may be used to modulate the image, on a pixel-by-pixel basis.

An example of a suitable spatial light modulator 106 is a digital micromirror device, or DMD. A typical DMD includes a rectangular array of small mirrors. Each mirror is electronically pivotable between two angled states, the angled states being angled, for example, roughly the same angular amount, but in opposing directions. In this example, both angled states are typically between ten and twelve degrees away from the plane of the DMD, in opposite directions. During use, one of the two angled states, corresponding to the first state mentioned above, directs light into the modulated exiting beam 124; this state may be considered to be an on state. During use, the other of the two angled states, corresponding to the second state mentioned above, does not direct light into the modulated exiting beam 124 and typically directs light to an absorber (not shown in FIG. 1); this state may be considered to be an off state. Alternatively, other suitable spatial light modulators may also be used, including those that transmit, rather than reflect, a modulated exiting beam.

A reimaging optic 108 is configured to collect the modulated exiting beam 124, produces a reimaged beam 126 from the modulated exiting beam 124, and forms a spatially modulated image with the reimaged beam 126 from the modulated exiting beam 124. Examples of suitable reimaging optics 108 can include lenses, mirrors, and combinations of lenses and mirrors. The spatially modulated image resembles the scene 102 in areas corresponding to light modulating elements 134 in the first state, e.g., the on state. For example, if all the light modulating elements 134 in spatial light modulator 106 were in the first state, e.g., the on state, then the spatially modulated image would look like the scene 102, possibly with an overall decrease in optical power due to losses at the imaging optic 104, the spatial light modulator 106 and the reimaging optic 108, or due to diffraction by the spatial pattern of modulating elements 134 in the spatial light modulator 106. As another example, if some of the light modulating elements 134 in spatial light modulator 106 were in the second state, e.g., the off state, then the spatially modulated image would resemble the scene 102, but with dark locations in the image that correspond with the locations of the off state light modulating elements 134 in the spatial light modulator 106.

The reimaged beam 126 strikes a sensor 110 at or near the location of the spatially modulated image, so that the spatially modulated image is received by the reimaged beam 126 thereon. The sensor 110 includes an array of sensor elements 136. The sensor elements 136 are fewer in number than the light modulating elements 134. The sensor elements 136 are typically arranged in a rectangular array, numbering P-by-Q, where P and Q are integers. Compared with the number of light modulating elements 136 in the spatial light modulator 106, M-by-N, P is less than M, Q is less than N, or both P and Q are less than M and N, respectively, such that the total number of P×Q elements 136 are less than the total number of M×N elements 134. The sensor 110 produces an electrical output signal 138 representative of the spatially modulated image. In some examples, the sensor elements 136 are independently addressable, so that the electrical output signal 138 need not scan through the entire set of sensor elements 136 to extract the value of one particular element 136.

A processing element 112 is configured to receive the electrical output signal 138. The processing element 112 can reconstruct a video signal 118 from the electrical output signal 138. The video signal 118 may be displayed to a user who can identify a region of interest manually, and/or may be directed to software that can automatically identify a region of interest in the scene 102, such as a person or a vehicle. The user, and/or the software, may determine a current location, and/or a projected future location of the region of interest, and may direct the region of interest location 114 back to the processing element 112. The processing element 112 may interpret the region of interest location 114, and direct a suitable modulator control signal 140 to the spatial light modulator 106. When at least one region of interest is identified in the scene 102, the processing element 112 switches the light modulating elements 134 to produce an increase in resolution in the at least one region of interest, and a decrease in video frame rate in the at least one region of interest.

The processing element 112 may also determine a mode of operation for the system 100, denoted as mode control 116. The processing element 112 can include a general purpose computer, a tablet computing device, a mobile computing device, an ASIC, a microprocessor, a FPGA, and/or the like. The mode control 116 may determine system-based aspects, such as how to use the region of interest, whether the system is in a lossless or a compressive sensing mode, and so forth. For instance, in a lossless mode, pixel cycling schemes, such as those discussed with reference to FIGS. 8 and 9, may be applied only to the region(s) of interest; in a compressive sensing mode, different schemes known in the art may be applied only to the region(s) of interest. In either mode, no modulation is applied to the portions of the scene 102 that are outside the region(s) of interest.

An example object 128 within the scene 102 is shown schematically as an arrow in FIG. 1. The example object 128 appears in both the unmodulated image and the modulated image in the system 100, where they are also shown as arrows in FIG. 1. The unmodulated image at the spatial light modulator 106 includes an arrow 130. The arrow 130 at the spatial light modulator 106 is inverted, compared to the arrow 128 in the scene 102, due to inverting properties of the imaging optic 104. The modulated image at the sensor 110 also includes an arrow 132. The arrow 132 is also inverted, due to inverting properties of the reimaging optic 108.

During operation, the imaging optic 104, the spatial light modulator 106, the reimaging optic 108, and the sensor 110 all remain in fixed positions with respect to one another. A particular location within the scene 102 maps to a unique location on the spatial light modulator 106, and a corresponding unique location on the sensor 110. As a result, one may draw correspondences between the light modulating elements 134 in the spatial light modulator 106 and the pixels in the sensor 110. If light from the scene 102 strikes a particular light modulating element 134 (in the on state), then the light will proceed through the system 100 to strike the pixel on the sensor 110 that corresponds to the particular light modulating element 134. FIGS. 2-5 show an example set of correspondences among an object in the scene, the light producing elements in the spatial light modulator, and the pixels in the sensor.

Figure 2:
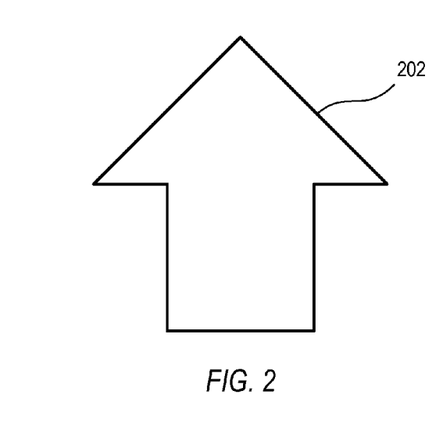
FIG. 2 is a schematic drawing of an object present in a scene imaged by the foveated imaging system of FIG. 1.

FIG. 2 is a schematic drawing of the object 202, present in the scene 102, and imaged by the foveated imaging system 100 of FIG. 1. Although the object 202 is drawn as an arrow, the object may be any suitable object of interest within the scene 102, such as a person or a vehicle.

Figure 3:
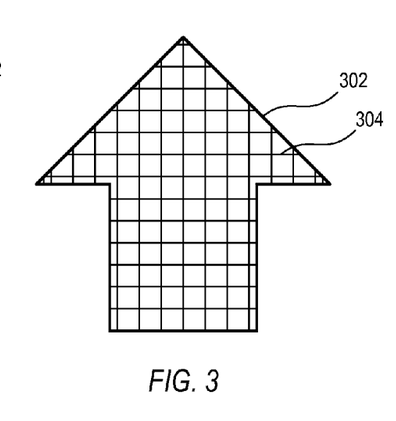
FIG. 3 is a schematic drawing of the object of FIG. 2, imaged onto the spatial light modulator of the foveated imaging system of FIG. 1, and having pixels from the spatial light modulator superimposed thereon.

FIG. 3 is a schematic drawing of the object 202 of FIG. 2, imaged onto the spatial light modulator 106 of the foveated imaging system 100 of FIG. 1, and having pixels from the spatial light modulator 106 superimposed thereon. FIG. 3 includes a grid 304 showing the boundaries between adjacent light modulating elements 134 in the spatial light modulator 106. The grid 304 is superimposed on the representation 302 of the object in the unmodulated image.

Figure 4:
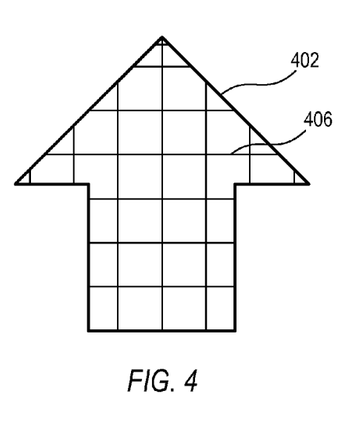
FIG. 4 is a schematic drawing of the object of FIG. 2, imaged onto the sensor of the foveated imaging system of FIG. 1, and having pixels from the sensor superimposed thereon.

FIG. 4 is a schematic drawing of the object 202 of FIG. 2, imaged onto the sensor 110 of the foveated imaging system 100 of FIG. 1, and having pixels from the sensor 110 superimposed thereon. FIG. 4 includes a grid 206 showing the boundaries between adjacent pixels in the sensor 110. The grid 406 is superimposed on the representation 402 of the object in the modulated image.

Figure 5:
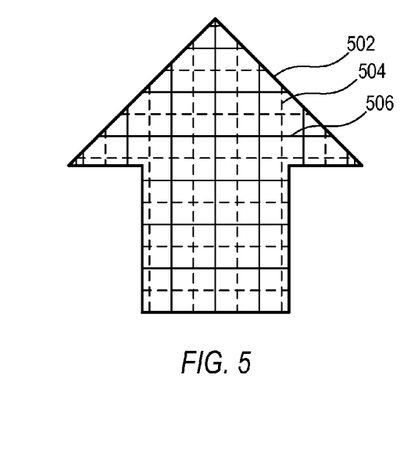
FIG. 5 is a schematic drawing of the object of FIG. 2, imaged onto the sensor of the foveated imaging system of FIG. 1, and having pixels from both the spatial light modulator and the sensor superimposed thereon.

FIG. 5 is a schematic drawing of the object 202 of FIG. 2, imaged onto the sensor 110 of the foveated imaging system 100 of FIG. 1, and having pixels from both the spatial light modulator 106 and the sensor 110 superimposed thereon. FIG. 5 includes a dashed grid 504 showing the boundaries between adjacent light modulating elements 134 in the spatial light modulator 106. FIG. 5 also includes a solid grid 506 showing the boundaries between adjacent pixels in the sensor 110. Both grids 504, 506 are superimposed on the representation 502 of the object in the modulated image.

As noted above, the sensor 110 includes fewer pixels than the spatial light modulator 106. In the example of FIGS. 2-5, the spatial light modulator 106 has twice as many pixels as the sensor 110, in both orthogonal directions, so that each pixel on the sensor 110 corresponds to four pixels on the spatial light modulator 106. This four-to-one ratio is just one example, and other suitable ratios may also be used.

Figure 6:
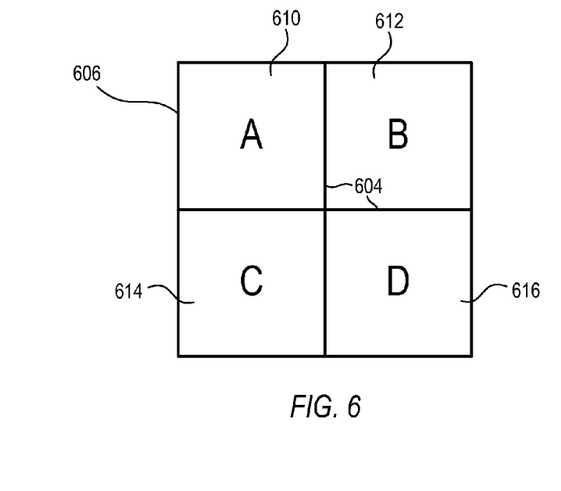
FIG. 6 is a schematic drawing of a plurality of spatial modulator pixels, superimposed on a corresponding single sensor pixel.

Because the pixels of the spatial light modulator 106 and the sensor 110 remain in a fixed relationship to each other during operation, it is beneficial to examine a single sensor pixel and the corresponding pixels on the spatial light modulator. FIG. 6 is a schematic drawing of a plurality of spatial modulator pixels 610, 612, 614, 616, superimposed on a corresponding single sensor pixel 606. The amount of optical power in each of the spatial modulator pixels 610, 612, 614, 616 is represented by A, B, C, and D, respectively. Grid lines 604 represent the boundaries between adjacent pixels on the spatial modulator.

This fixed relationship between a sensor pixel 606 and its corresponding spatial modulator pixels 610, 612, 614, 616 may be used to provide varying degrees of resolution for the scene 102, as the scene 102 varies in time. For instance, if all the light modulating elements 134 are set to the on state, then the sensor pixel 606 receives light from all of its corresponding spatial modulator pixels 610, 612, 614, 616, and the sensor pixel 606 records an optical power value equal to (A+B+C+D). This example represents relatively low resolution of the scene 102, because optical features in the scene smaller than a sensor pixel 606 are not resolved.

Figure 7:
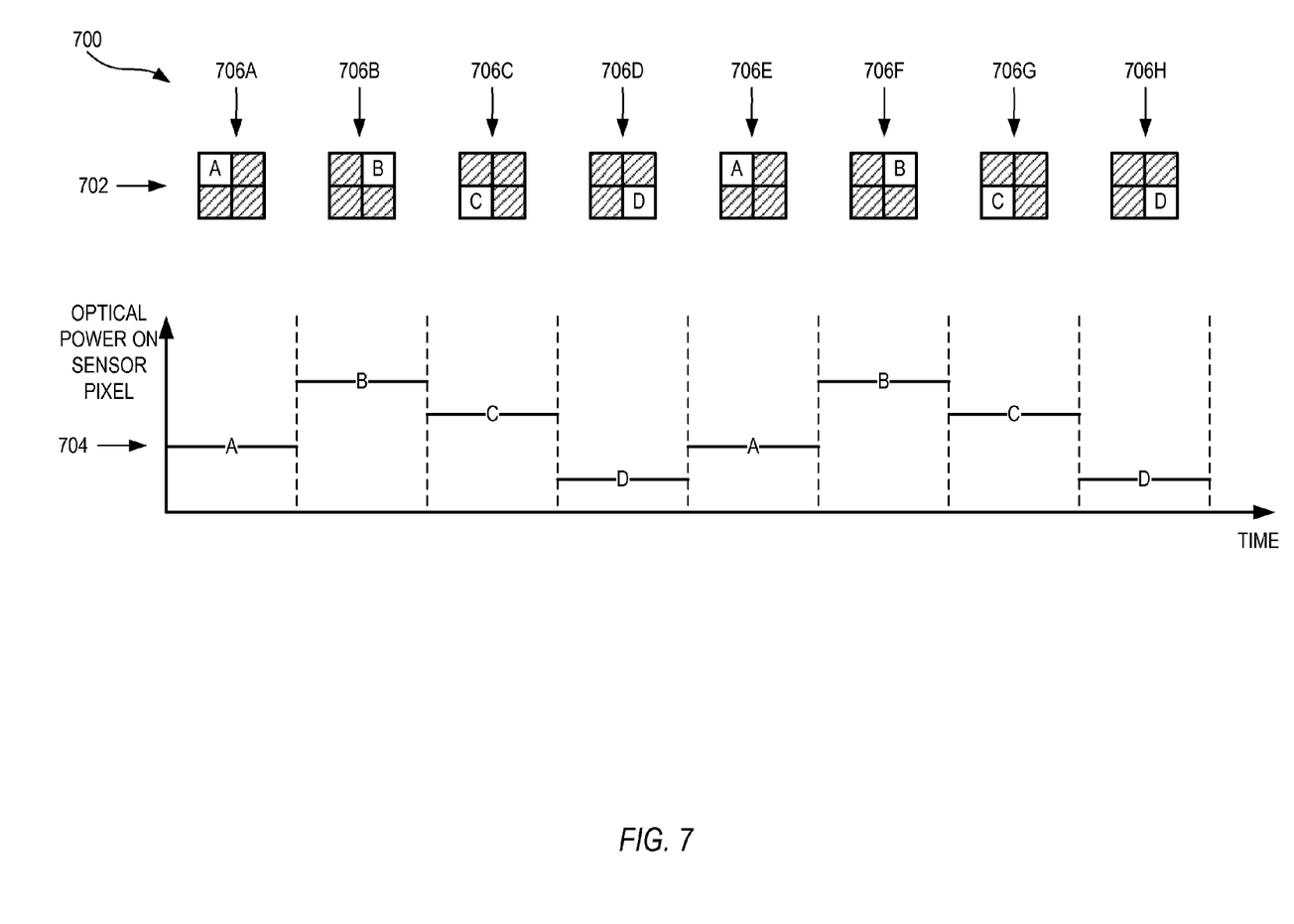
FIG. 7 is a schematic drawing of a sequence of frames for the plurality of spatial modulator pixels of FIG. 6, with a corresponding plot over time of an optical power on the corresponding sensor pixel.

An example representing relatively high resolution is shown in FIG. 7. FIG. 7 is a schematic drawing of a sequence 700 of frames 706A-H for a plurality of spatial modulator pixels 702 associated with a single sensor pixel. In this example, only one modulator pixel 702 at a time is in the on state, while the other modulator pixels 702 in the plurality are in the off state. If there are X number of modulator pixels 702 in the plurality, then the sequence 700 includes X frames, with each frame having a different modulator pixel 702 in the on state.

FIG. 7 also includes a corresponding plot 704 over time of an optical power on the sensor pixel. The sequence of power levels corresponds to the optical power striking each of the modulator pixels 702. A particular optical power value may be obtained from an electrical signal from the sensor pixel, from examination of the electrical signal at a particular time. The example of FIG. 7 represents relatively high resolution of the scene 102, because optical features in the scene comparable to a modulator pixel 702 may be resolved. Compared with the low resolution example, the high resolution example in FIG. 7 may take longer to transmit over a data channel having a fixed data rate, by a factor of X, where X is the number of modulator pixels 702 in the plurality. Typical systems may use this high resolution only for one or more regions of interest within the scene 102. Typical systems may transmit the high resolution data corresponding to the one or more regions of interest at a reduced video frame rate, so as not to exceed a maximum data rate for transmission, storage and/or processing the electrical signals from the sensor pixels.

Figure 8:
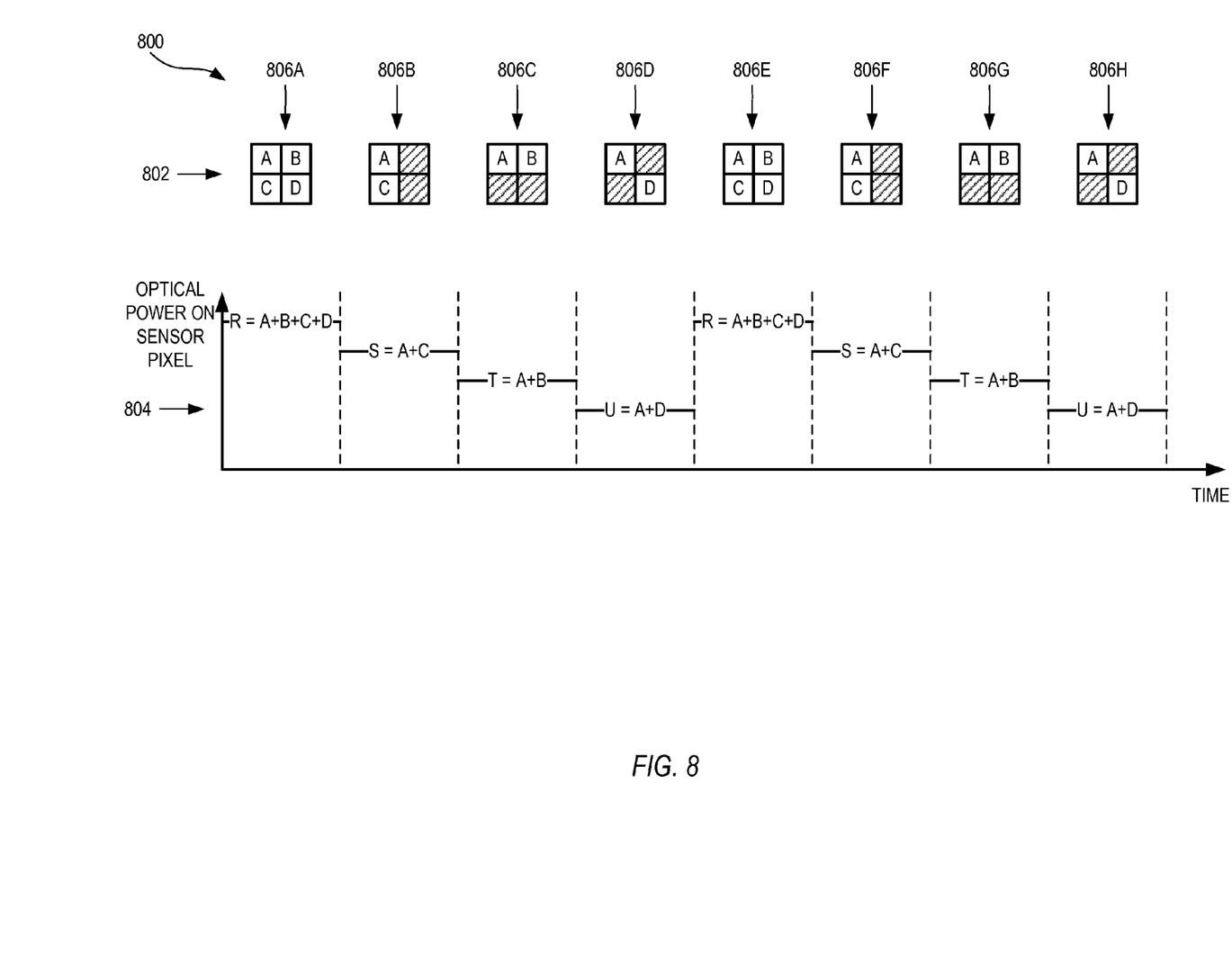
FIG. 8 is a schematic drawing of a sequence of orthogonal frames for the plurality of spatial modulator pixels of FIG. 6, with a corresponding plot over time of an optical power on the corresponding sensor pixel.

Another example representing relatively high resolution is shown in FIG. 8. FIG. 8 is schematic drawing of a sequence 800 of orthogonal frames 806A-H for the plurality of spatial modulator pixels 802 associated with a single sensor pixel. In this example, more than one spatial modulator pixels 802 at a time is in the on state. If there are X number of modulator pixels 802 in the plurality, then the sequence 800 includes X frames, with each frame having a different combination of modulator pixels 802 in the on state. The frames 806A-H are said to be orthogonal because the scene information content of any single frame is devoid of information from the other frames in the sequence. Other suitable orthogonal sequences may be used.

FIG. 8 also includes a corresponding plot 804 over time of optical power on the sensor pixel. In this example, the optical power on the sensor pixel cycles through four combinations of modulator pixels, shown in the four frames 806A-D and repeated in 806E-H. For convenience, the four combinations of modulator pixels are denoted as R, S, T, and U, and are defined as follows: R=(A+B+C+D), S=(A+C), T=(A+B), and U=(A+D). The individual power levels for A, B, C, and D may be calculated from the four power levels on the sensor pixel as follows: $A=(-R+S+T+U)/2$, $B=(R-S+T-U)/2$, $C=(R+S-T-U)/2$, and $D=(R-S-T+U)/2$.

In the examples of FIGS. 7 and 8, the effective synthesized video frame rate is one-fourth of the sensor video frame rate, and is also one-fourth of the rate at which the modulator pixels are refreshed. In some cases, a high-resolution image may be delivered for every four video frames. For these cases, in the example of FIG. 8, the pixel values of (R,S,T,U) may be used for each high-resolution image, with a pause between each high-resolution image to refresh all four values of R, S, T, and U. In other cases, it may be desirable to deliver an image at the full video frame rate. For these cases, only one of the four pixel values is refreshed from frame-to-frame. For instance, a first image may use the sequence of (R,S,T,U), the next image may use the sequence of (S,T,U,R), then the next image may use (T,U,R,S), and so forth. For these cases, the synthesized image is refreshed every frame, but maintains a three-frame latency for each image.

The signal to noise ratios of the examples of FIGS. 7 and 8 are expected to be the same, assuming that each frame has the same readout noise, and the readout noise terms add in quadrature. In general, it is expected that the signal to noise ratio should be the same for most, or all, orthogonal modulation sequences. In some applications, the modulation scheme of FIG. 8 may be preferable to that of FIG. 7, because the dynamic range of the sensor and the associated electronic components may be reduced. Furthermore, if low resolution imaging is interspersed with high resolution imaging, then it may be preferable to use a modulation scheme that includes a frame that has all the modulation pixels set to an on state, as in 806A, because such a modulation scheme may allow for use of the same frame (e.g., 806A) for both the low resolution imaging and the high resolution imaging, thereby optimizing the frame rate for both low resolution and high resolution.

It is beneficial to clarify the terms sensing and synthesizing, with respect to a particular image. The term sensing, as used herein, is intended to mean the process of physically acquiring modulated imagery at the sensor 110, which is a physical light-sensing detector. Sensing, as used herein, occurs at the same rate as the modulation at the spatial light modulator 106. The term synthesizing, as used herein, is intended to mean forming an image from data corresponding to one or more regions of interest within the scene. The mapping schemes of FIGS. 7 and 8 are examples of how a sensor image may be synthesized, pixel-by-pixel, from a corresponding modulator image.

To further clarify, the term effective synthesized video frame rate is intended to mean the rate at which the sensor image is synthesized. In the examples of FIGS. 7 and 8, the effective synthesized video frame rate is one-fourth of the rate at which the modulator pixels are refreshed. In these examples, the effective synthesized video frame rate is also one-fourth of the sensor video frame rate.

The effective rate at which the processing element 112 synthesizes images of the region(s) of interest at the full modulator resolution may be lower than at the full sensing rate, due to latency in acquiring the sequence of images, but the full modulator resolution images may still be updated at the full sensing rate. For instance, if a scene changes relatively slowly, the sub-images within the region of interest may appear to move at the full sensing rate. If the scene changes relatively quickly, the images may be distorted due to the latency, but the images may change with the rest of the scene.

Figure 9:
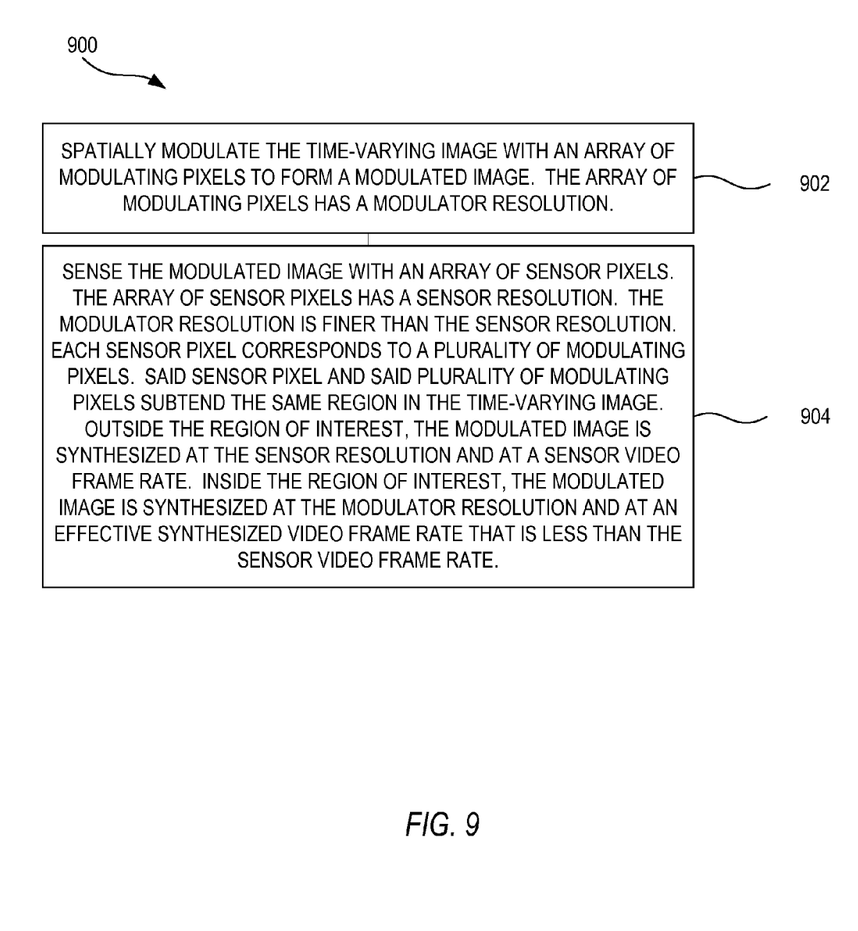
FIG. 9 is a flow chart of an example method that can synthesize a time-varying image having at least one time-varying region of interest therewithin.

FIG. 9 is a flow chart of an example method 900 that can synthesize a time-varying image having at least one time-varying region of interest therewithin. Step 902 spatially modulates the time-varying image with an array of modulating pixels to form a modulated image. A suitable array of modulating pixels may be spatial light modulator 106 of FIG. 1. The array of modulating pixels has a modulator resolution. Step 904 synthesizes the modulated image with an array of sensor pixels. A suitable array of sensor pixels may be the sensor 110 of FIG. 1. The array of sensor pixels has a sensor resolution. The modulator resolution is finer than the sensor resolution. Each sensor pixel corresponds to a plurality of modulating pixels. Said sensor pixel and said plurality of modulating pixels subtend the same region in the time-varying image. Outside the region of interest, the modulated image is synthesized at the sensor resolution and at a sensor video frame rate. Inside the region of interest, the modulated image is synthesized at the modulator resolution and at an effective synthesized video frame rate that is less than the sensor video frame rate.

In addition, each modulating pixel may be switchable between an on state and an off state. The on state may comprise directing at least a portion of time-varying image light, incident on said modulating pixel, to the modulated image. The off state may comprise blocking the time-varying image light, incident on said modulating pixel. Inside the region of interest, said plurality of modulating pixels may be modulated in an orthogonal sequence of frames. In one frame of the orthogonal sequence, all the modulating pixels in the plurality may be in the on state. In all frames of the orthogonal sequence, at least two of the modulating pixels in the plurality may be in the on state.

Figure 10:
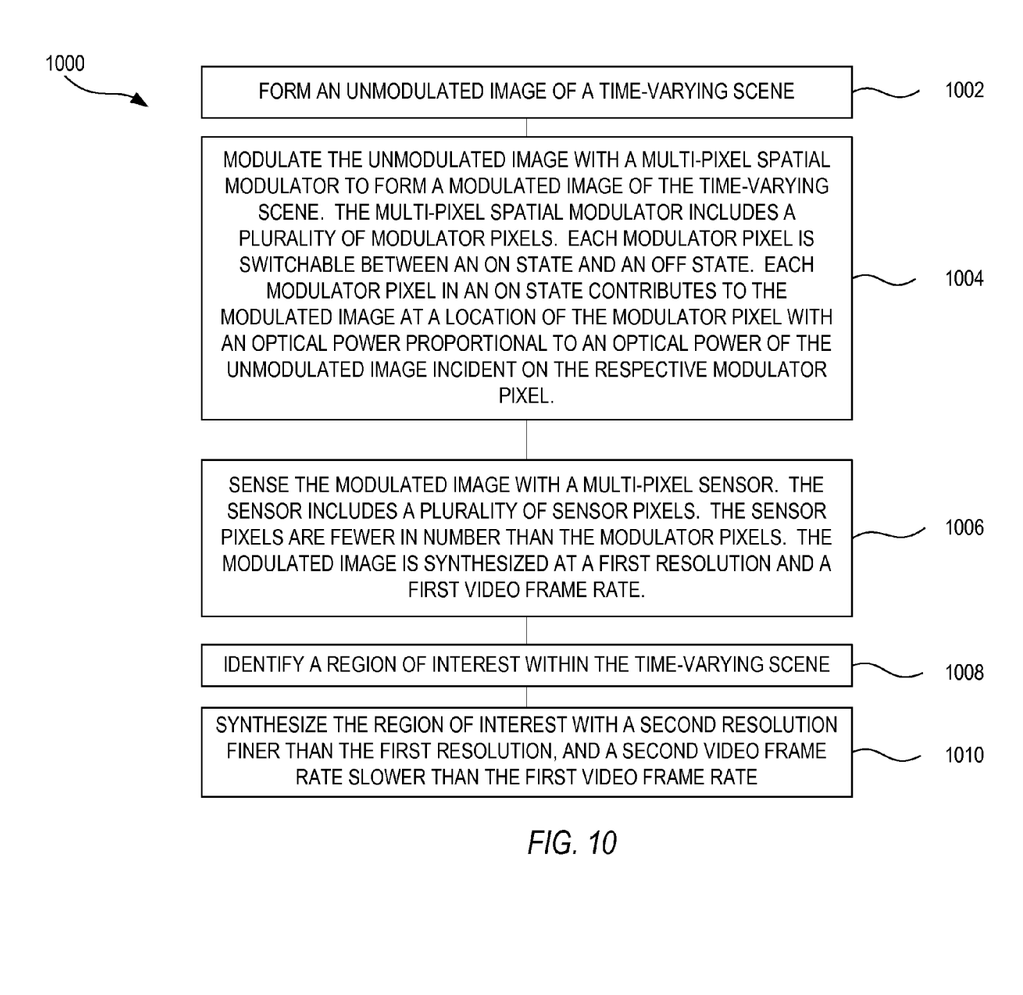
FIG. 10 is a flow chart of an example method of operation for the foveated imaging system of FIG. 1.

FIG. 10 is a flow chart of an example method 1000 of operation for the foveated imaging system 100 of FIG. 1. Step 1002 forms an unmodulated image of a time-varying scene. Step 1004 modulates the unmodulated image with a multi-pixel spatial modulator to form a modulated image of the time-varying scene. The multi-pixel spatial modulator includes a plurality of modulator pixels. Each modulator pixel is switchable between an on state and an off state. Each modulator pixel in an on state contributes to the modulated image at a location of the modulator pixel with an optical power proportional to an optical power of the unmodulated image incident on the respective modulator pixel. Step 1006 synthesizes the modulated image with a multi-pixel sensor. The sensor includes a plurality of sensor pixels. The sensor pixels are fewer in number than the modulator pixels. The modulated image is synthesized at a first resolution and a first video frame rate. Step 1008 identifies a region of interest within the time-varying scene. Step 1010 synthesizes the region of interest with a second resolution finer than the first resolution, and a second video frame rate slower than the first video frame rate.

The first resolution may correspond to the resolution of the multi-pixel sensor. The second resolution may correspond to the resolution of multi-pixel spatial modulator. Each sensor pixel may correspond with a plurality of the modulator pixels. Said sensor pixel and said plurality of modulator pixels may occupy the same position within the time-varying scene. Within the region of interest, said plurality of modulator pixels may be switched on and off in an orthogonal sequence. The number of modulator pixels in said plurality may be X. Within the region of interest, said sensor pixel may record X values of optical power. The X values of optical power may be orthogonal combinations of optical power from the X modulator pixels. The optical powers of the individual modulator pixels may be determined from the orthogonal combinations of optical power from the modulator pixels. In one of the orthogonal combinations, all the modulator pixels in the plurality may be switched on. The optical powers of the individual modulator pixels may be determined at second video frame rate. The second video frame rate may equal the first video frame rate, divided by X. Outside the region of interest, said plurality of modulator pixels may be all switched on. Outside the region of interest, the optical powers of the individual modulator pixels may be combined onto the same sensor pixel and may be indistinguishable from one another. The unmodulated image of the time-varying scene may be formed with an imaging optic disposed between the time-varying scene and the unmodulated image. The modulated image of the time-varying scene may be formed with a reimaging optic disposed between the multi-pixel spatial modulator and the modulated image. Each of the above statements may be combined with any of the other statements in any combination.

Some embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

What is claimed is:

1. A method of sensing a time-varying image having at least one time-varying region of interest therewithin, the method comprising:
   spatially modulating the time-varying image with an array of modulating pixels to form a modulated image, the array of modulating pixels having a modulator resolution; and
   sensing the modulated image with an array of sensor pixels, the array of sensor pixels having a sensor resolution, the modulator resolution being finer than the sensor resolution;
   wherein each sensor pixel corresponds to a plurality of modulating pixels, said sensor pixel and said plurality of modulating pixels subtending the same region in the time-varying image;
   wherein outside the region of interest, the modulated image is synthesized at the sensor resolution and at a sensor video frame rate;
   wherein inside the region of interest, the modulated image is synthesized at the modulator resolution and at an effective synthesized video frame rate that is less than the sensor video frame rate;
   wherein each modulating pixel is switchable between an on state and an off state;
   wherein the on state comprises directing at least a portion of time-varying image light, incident on said modulating pixel, to the modulated image;
   wherein the off state comprises blocking the time-varying image light, incident on said modulating pixel;
   wherein inside the region of interest, said plurality of modulating pixels are modulated in an orthogonal sequence of frames; and
   wherein in one frame of the orthogonal sequence, all the modulating pixels in the plurality are in the on state.

2. A method of sensing a time-varying image having at least one time-varying region of interest therewithin, the method comprising:
   spatially modulating the time-varying image with an array of modulating pixels to form a modulated image, the array of modulating pixels having a modulator resolution; and
   sensing the modulated image with an array of sensor pixels, the array of sensor pixels having a sensor resolution, the modulator resolution being finer than the sensor resolution;
   wherein each sensor pixel corresponds to a plurality of modulating pixels, said sensor pixel and said plurality of modulating pixels subtending the same region in the time-varying image;
   wherein outside the region of interest, the modulated image is synthesized at the sensor resolution and at a sensor video frame rate;
   wherein inside the region of interest, the modulated image is synthesized at the modulator resolution and at an effective synthesized video frame rate that is less than the sensor video frame rate;
   wherein each modulating pixel is switchable between an on state and an off state;
   wherein the on state comprises directing at least a portion of time-varying image light, incident on said modulating pixel, to the modulated image;
   wherein the off state comprises blocking the time-varying image light, incident on said modulating pixel;
   wherein inside the region of interest, said plurality of modulating pixels are modulated in an orthogonal sequence of frames; and
   wherein in all frames of the orthogonal sequence, at least two of the modulating pixels in the plurality are in the on state.

3. A method, comprising:
   forming an unmodulated image of a time-varying scene;
   modulating the unmodulated image with a multi-pixel spatial modulator to form a modulated image of the time-varying scene, the multi-pixel spatial modulator including a plurality of modulator pixels, each modulator pixel being switchable between an on state and an off state; each modulator pixel in an on state contributing to the modulated image at a location of the modulator pixel with an optical power proportional to an optical power of the unmodulated image incident on the respective modulator pixel;
   sensing the modulated image with a multi-pixel sensor, the sensor including a plurality of sensor pixels, the sensor pixels being fewer in number than the modulator pixels, the modulated image being synthesized at a first resolution and a first video frame rate;
   identifying a region of interest within the time-varying scene; and
   synthesizing the region of interest with a second resolution finer than the first resolution, and a second video frame rate slower than the first video frame rate;
   wherein each sensor pixel corresponds with a plurality of the modulator pixels, said sensor pixel and said plurality of modulator pixels occupying the same position within the time-varying scene;
   wherein within the region of interest, said plurality of modulator pixels are switched on and off in an orthogonal sequence;
   wherein the number of modulator pixels in said plurality is X;
   wherein within the region of interest, said sensor pixel records X values of optical power, the X values of optical power being orthogonal combinations of optical power from the X modulator pixels;
   wherein the optical powers of the individual modulator pixels are determined from the orthogonal combinations of optical power from the modulator pixels; and
   wherein in one of the orthogonal combinations, all the modulator pixels in the plurality are switched on.

4. A method, comprising:
   forming an unmodulated image of a time-varying scene;

modulating the unmodulated image with a multi-pixel spatial modulator to form a modulated image of the time-varying scene, the multi-pixel spatial modulator including a plurality of modulator pixels, each modulator pixel being switchable between an on state and an off state; each modulator pixel in an on state contributing to the modulated image at a location of the modulator pixel with an optical power proportional to an optical power of the unmodulated image incident on the respective modulator pixel;

sensing the modulated image with a multi-pixel sensor, the sensor including a plurality of sensor pixels, the sensor pixels being fewer in number than the modulator pixels, the modulated image being synthesized at a first resolution and a first video frame rate;

identifying a region of interest within the time-varying scene; and synthesizing the region of interest with a second resolution finer than the first resolution, and a second video frame rate slower than the first video frame rate;

wherein each sensor pixel corresponds with a plurality of the modulator pixels, said sensor pixel and said plurality of modulator pixels occupying the same position within the time-varying scene;

wherein outside the region of interest, said plurality of modulator pixels are all switched on; and wherein outside the region of interest, the optical powers of the individual modulator pixels are combined onto the same sensor pixel and are indistinguishable from one another.

* * * * *